United States Patent [19]

Laudszun et al.

[11] Patent Number: 5,090,778
[45] Date of Patent: Feb. 25, 1992

[54] WHEEL SUPPORT FOR TRAILER AXLES

[75] Inventors: Heinz Laudszun; Helmut Steiner, both of Wiehl; Hans J. Leidig, Reichshof, all of Fed. Rep. of Germany

[73] Assignee: Bergische Achsenfabrik Fr. Kotz & Söhne, Wiehl, Fed. Rep. of Germany

[21] Appl. No.: 551,928

[22] Filed: Jul. 12, 1990

[30] Foreign Application Priority Data

Jul. 12, 1989 [DE] Fed. Rep. of Germany ....... 3922858

[51] Int. Cl.⁵ ............................................. B60B 27/00
[52] U.S. Cl. ............................... 301/105 R; 301/124 R
[58] Field of Search ............... 301/105 R, 108 R, 111, 301/124 R, 126, 131, 9 DN, 9 CN; 384/101, 102, 126, 127, 128, 624

[56] References Cited

U.S. PATENT DOCUMENTS

| 4,121,871 | 10/1978 | Adams | 301/105 R |
| 4,811,992 | 3/1989 | Steiner | 301/124 R X |
| 5,031,967 | 7/1991 | Svensson | 301/105 R |

FOREIGN PATENT DOCUMENTS

| 207648 | 11/1906 | Fed. Rep. of Germany. |
| 1675685 | 1/1970 | Fed. Rep. of Germany. |
| 2228062 | 12/1973 | Fed. Rep. of Germany. |
| 2505081 | 8/1976 | Fed. Rep. of Germany. |
| 3643081 | 6/1988 | Fed. Rep. of Germany. |
| 3713224 | 10/1988 | Fed. Rep. of Germany. |
| 2408753 | 6/1979 | France. |
| 248323A1 | 8/1987 | German Democratic Rep.. |

Primary Examiner—Russell D. Stormer
Attorney, Agent, or Firm—Robert W. Becker & Associates

[57] ABSTRACT

A wheel support for trailer axles is provided, and includes tapered-roller bearings disposed on an axle neck; it also includes a hub that is rotatably mounted on the bearings. The hub serves for the mounting of a brake drum and a wheel, with a thrust washer being disposed between the axle neck and the inner tapered-roller bearing, and with an axle nut being screwed onto an outer thread of the axle neck outwardly of the outer tapered-roller bearing. To provide a partial preassembly and to simplify the mounting and removal of the wheel support, the thrust washer is secured in the hub via a first snap ring, the axle nut is provided with a collar that extends to the inner wall of the hub, and the axle nut is secured at its collar in the hub via a second snap ring.

6 Claims, 2 Drawing Sheets

WHEEL SUPPORT FOR TRAILER AXLES

BACKGROUND OF THE INVENTION

The present invention relates to a wheel support for trailer axles and has tapered-roller bearings disposed on an axle neck, and also has a hub that is rotatably mounted on the tapered-roller bearings, with the hub serving for the mounting of a brake drum and a wheel, whereby a thrust washer is disposed between the axle neck and an inner one of the tapered-roller bearings, and whereby outwardly of an outer one of the tapered-roller bearings, an axle nut is screwed onto an outer thread of the axle neck.

The wheel supports for trailer axles must be constructed in such a way that the hub, with the brake drum secured thereto, can be withdrawn from the axle neck in order to service the brake, for example to replace the brake linings. If, after removing the axle nut, a conventional wheel support having a one-piece hub is removed from the axle neck, the two tapered-roller bearings and the thrust washer, as well as various seals, must be separately removed from the hub and must subsequently again be reassembled. In addition, it is necessary to replace the grease filling of the wheel support. In order to avoid this cumbersome and complicated manner of operation, U.S. Pat. No. 4,811,992 discloses a wheel support where the hub comprises an inner hub on which is fixedly secured an outer hub that, however, together with the brake drum that is secured thereon, can be removed from the inner hub, while the inner hub, with the axle nut, the tapered-roller bearings, and the thrust washer, remains on the axle neck. Unfortunately, this known wheel support with its double-hub construction is very expensive and complicated to produce if it is to function satisfactorily and not present any safety risks.

DE-AS 25 05 081 discloses an arrangement for supporting or mounting a vehicle wheel and includes an outer support portion that is provided with a mounting hole, and also includes an inner support portion that is mounted in the mounting hole via a roller bearing and contains the axle journals, whereby one support portion is connected to the vehicle wheel and the other support portion is connected with wheel-guide members that are connected to the vehicle body. The outer ring of the roller bearing is fixed in the mounting hole of the outer support portion with the aid of two snap rings. With this heretofore known arrangement, disassembly of the hub and the roller bearing is possible only with great effort.

It is therefore an object of the present invention to provide a wheel support that has a straightforward construction and a one-piece hub, with the hub, along with inserted tapered-roller bearings, thrust washer, and axle nut, being preassembled and being mounted on the axle neck as a unit, and also being adapted to be removed as a unit.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
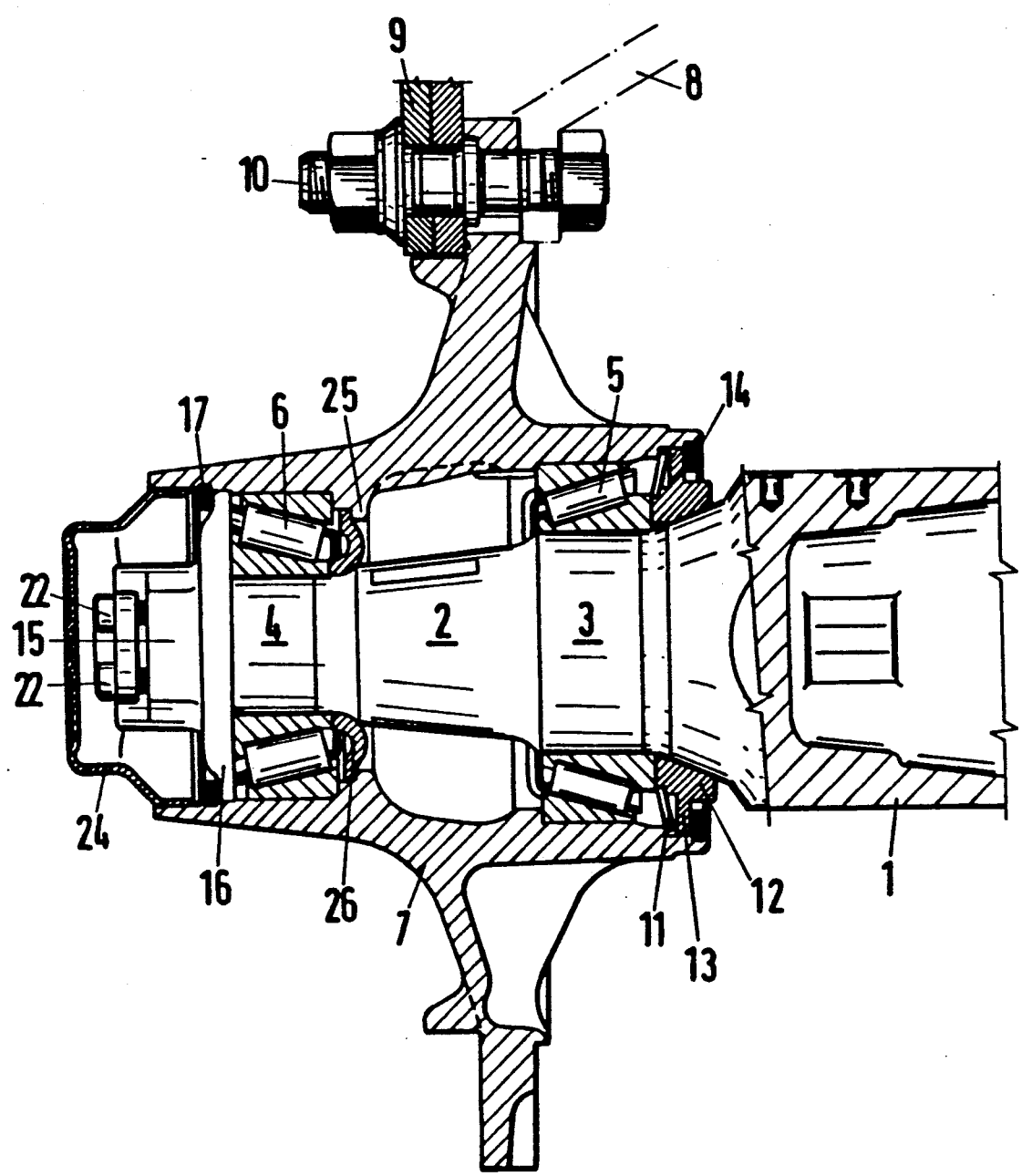
FIG. 1 is a cross-sectional view through one exemplary embodiment of the inventive wheel support mounted on an axle neck.

The wheel support of the present invention is characterized primarily in that the thrust washer is secured in the hub via a first snap ring, the axle nut has a collar that extends to the inner wall of the hub, and the axle nut is secured at its collar in the hub via a second snap ring.

A wheel support that is constructed pursuant to the inventive teaching has the advantage that the hub, the two tapered-roller bearings, the thrust washer, and the axle nut form a single structural unit after preassembly via the two snap rings, with this unit being mounted as such on the axle neck and also being adapted to be withdrawn there-from as a unit. A particular advantage of the inventive wheel support is that not only is the placement of the hub unit on the axle neck into the final position of the tapered-roller bearings effected via the axle nut, but also during removal the axle nut can simultaneously be utilized as a removal tool because it can rotate freely in the hub and its collar engages behind the second snap ring, which engages in the hub.

Pursuant to one practical specific embodiment of the present invention, the axle nut can be provided with a radial slot that is disposed near the outer end, with the free, resilient portion being adapted to be tightened against the inner portion of the axle nut via at least one setscrew. An axle nut embodied in this manner, whereby in a preferred embodiment the slot extends to the center of the axle, and two setscrews are disposed in the region of the resilient portion, effects an excellent securement of the final mounted wheel support.

The thrust washer can also be provided with a flange that extends to the inner wall of the hub and that engages behind the first snap ring.

Finally, pursuant to a further specific embodiment of the present invention, a ring-shaped means to protect against discharge can be disposed between an inwardly projecting shoulder of the hub and the inner ring of the outer tapered-roller bearing, with this discharge-protection means being supported against the hub and against the inner ring of the outer tapered-roller bearing.

Further specific features of the present invention will be described in detail subsequently.

DESCRIPTION OF PREFERRED EMBODIMENTS

Referring now to the drawings in detail, secured or formed on the end of the body 1 of an axle is an axle neck 2 that is provided with two spaced-apart bearing seats 3, 4 for an inner tapered-roller bearing 5 and an outer tapered-roller bearing 6 respectively. Between the two tapered-roller bearings 5, 6, the axle neck 2 has a conical configuration.

Freely rotatably mounted on the two tapered-roller bearings 5, 6 is a one-piece hub 7. On the outer periphery of the hub 7, a brake drum 8 can be secured on one side, and a wheel 9 can be secured on the opposite side via bolts 10.

Disposed on the outer periphery of the inner tapered-roller bearing 5 are a sealing ring 11 and a thrust washer 12. The outer periphery of the thrust washer !2 is provided with a flange 13 that extends to the inner wall of the hub 7. A first snap ring 14 is disposed ahead of the flange 13 in an inner, annular groove of the hub 7.

Disposed at the other end, in front of the outer tapered-roller bearing 6, is an axle nut 15 on which is formed a flange or collar 16 that extends to the inner wall of the hub 7. Toward the outside, ahead of the collar 16, a second snap ring 17 is disposed in an annular groove of the hub 7.

Figure 3:
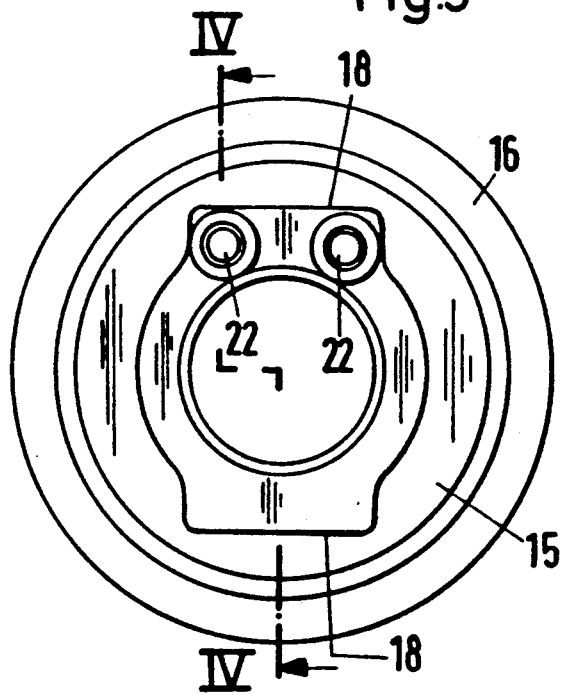
FIG. 3 is a plan view of an axle nut.

The axle nut 15 is provided with surfaces 18 (See FIG. 3) for applying a tool for tightening the axle nut 15 onto, or loosening it from, the axle neck 2, for example via a threaded connection. In the region of that portion that is provided with the surfaces 18, the axle nut 15 is provided with a slot 19 that extends to the center of the axle. The resulting, resilient portion 20 is provided with two holes 21 in Which setscrews 22 are inserted that can be screwed into threaded holes 23.

The opening of the hub 7 is closed off by a cap 24.

A ring-shaped means 26 to protect against discharge is disposed between an inwardly projecting shoulder 25 of the hub 7 and the inner ring of the outer tapered-roller bearing 6.

Figure 2:
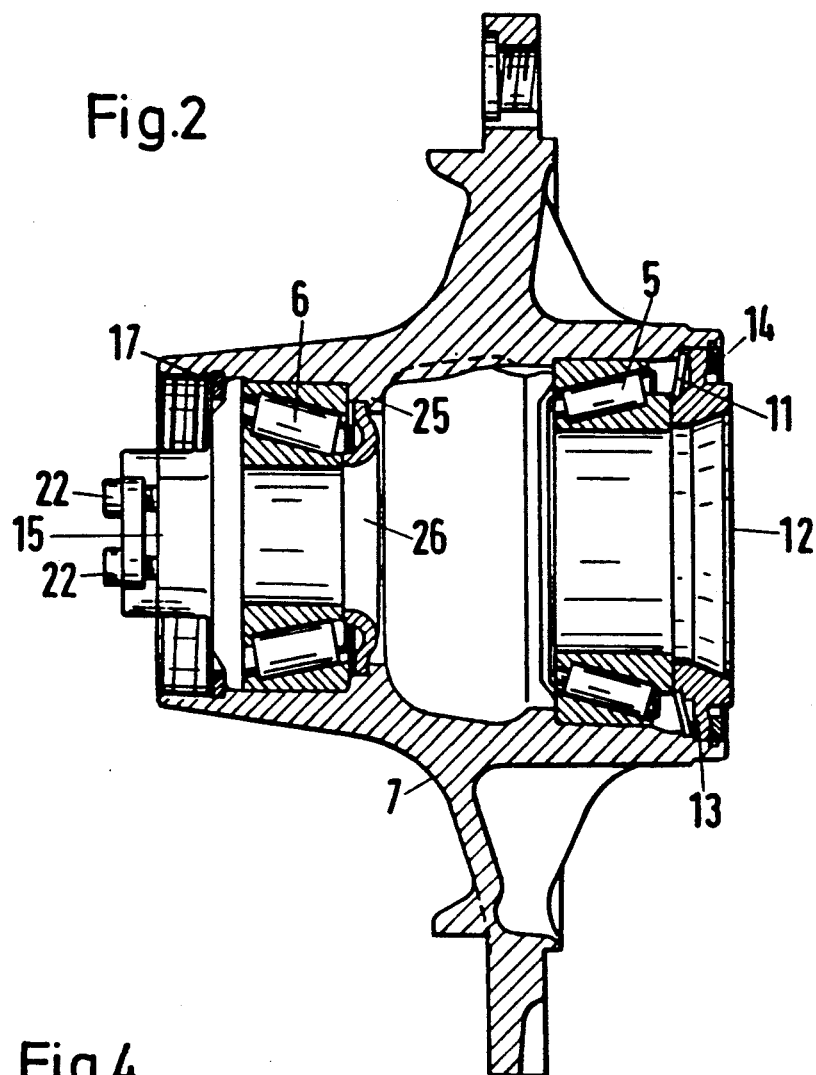
FIG. 2 is a cross-sectional view of a preassembled hub or one that has been removed from an axle neck.
Figure 4:
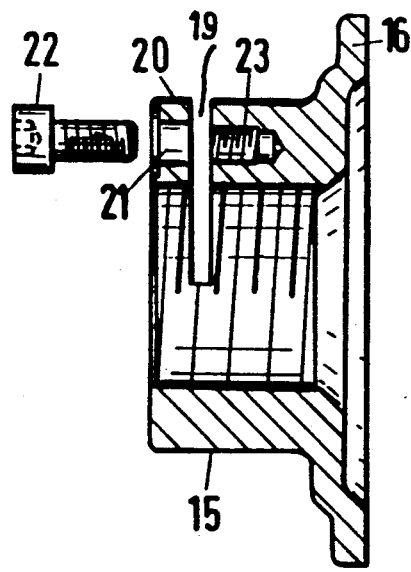
FIG. 4 is a cross-sectional view of the axle nut taken along the line IV—IV in FIG. 3.

The hub 7, the two tapered-roller bearings 5 and 6, the sealing ring 11, the thrust washer 12, the inner discharge-protection means 26, and the axle nut 15 can be preassembled with the two snap rings 14, 17 in the manner illustrated in FIG. 2. This preassembled hub unit can then be placed in its entirety upon the axle neck 2 and, by screwing the axle nut 15 onto a threaded end of the axle neck 2, can be tightened until the two tapered-roller bearings 5, 6 have reached their final position and the thrust washer 12 rests against an inner conical surface of the axle neck 2. In this operating position, the axle nut 15 is fixed upon the threaded end of the axle neck 2 via the two setscrews 22.

To remove the hub unit from the axle neck 2, the two setsrews 22 are first loosened. The hub unit can then be withdrawn from the axle neck 2 via the axle nut 15, which is supported on the axle neck 2 and engages behind the second snap ring 17.

With a hub unit constructed pursuant to the present invention, mounting and removal of the wheel hub is surprisingly easy. When the inventive hub unit is removed in order to service the brakes, the grease that was introduced into the hollow space of the hub 7 between the two tapered-roller bearings 5, 6 prior to the assembly need not be replaced. It is also not absolutely necessary to replace the grease in the hub cap 24 when the hub unit is removed. However, it may be expedient to do so.

The present invention is, of course, in no way restricted to the specific disclosure of the specification and drawings, but also encompasses any modifications within the scope of the appended claims.

What we claim is:

1. In a wheel support for trailer axles having tapered-roller bearings disposed on an axle neck, and also having a hub that is rotatably mounted on said bearings, with said hub serving for the mounting of a brake drum and a wheel, whereby a thrust washer is disposed between said axle neck and an inner one of said bearings, and whereby outwardly of an outer one of said bearings, an axle nut is screwed onto an outer thread of said axle neck, the improvement comprising:

a first snap ring for securing said thrust washer in said hub;

a collar that is provided on said axle nut and extends to an inner wall of said hub; and a second snap ring disposed at said collar for securing said axle nut in said hub to thereby form, after preassembly, a structural unit comprised of said hub, said bearing, said thrust washer, and said axle nut, with said structural unit being adapted as such to be disposed on and removed from said axle neck.

2. A wheel support according to claim 1, in which said axle nut is provided with a radial slot in the vicinity of an outer end thereof to thereby form a free, resilient portion that is adapted to be tightened against an inner portion of said axle nut via at least one setscrew.

3. A wheel support according to claim 2, in which said slot extends to a central axis of said axle nut.

4. A wheel support according to claim 3, in which two-setscrews are disposed in the vicinity of said resilient portion of said axle nut.

5. A wheel support according to claim 1, in which said thrust washer is provided with a flange that extends to said inner wall of said hub and engages behind said first snap ring.

6. A wheel support according to claim 1, in which said hub has an inwardly extending shoulder; and in which a ring-shaped means to protect against discharge is disposed between said shoulder and an inner ring of said outer one of said bearings

* * * * *